United States Patent Office 2,741,659
Patented Apr. 10, 1956

2,741,659
ACID AMIDE DERIVATIVES OF AZO-DYESTUFFS

Max Schmid, Riehen, Eduard Moser, Basel, Jakob Danuser, Arlesheim, Rudolf Mory, Binningen, Willy Mueller, Riehen, and Jakob Wuergler, Neuewelt, near Basel, Switzerland, assignors to Ciba Limited, Basel, Switzerland, a Swiss firm No Drawing. Application October 19, 1953, Serial No. 387,068

Claims priority, application Switzerland October 20, 1952

7 Claims. (Cl. 260—174)

The present application is a continuation-in-part of our co-pending application Ser. No. 273,364, filed February 25, 1952. The present invention relates to new acid amide derivatives of azo-dyestuffs which are free from sulfonic acid groups and correspond to the general formula

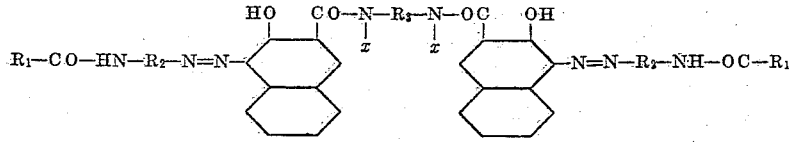

wherein $R_1$ and $R_2$ each represent a benzene radical, $x$ stands for hydrogen or an alkyl group of low molecular weight and

   (2)

is the radical of a non-vattable diamine.

These acid amides are advantageously prepared by condensing 2 molecular proportions of a halide of the formula (3)
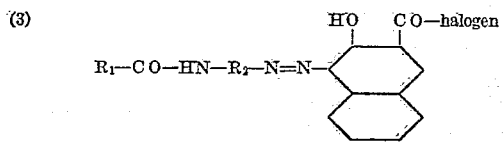

or one molecular proportion each of two different halides, both corresponding to the Formula 3, with one molecular proportion of a diamine of the formula (4)   

The meanings of $R_1$, $R_2$, $R_3$ and $x$ in Formulae 3 and 4 are shown in the first paragraph.

The acid halides may be obtained by treating the appropriate carboxylic acids with acid halogenating agents. These carboxylic acids of the formula (5)
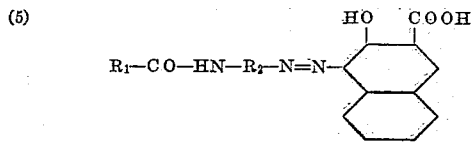

may in turn be prepared by methods in themselves known by coupling diazotized aminobenzoyl-aminobenzenes free from sulfonic acid groups with 2-hydroxy-naphthalene-3-carboxylic acid. There come more especially into consideration 1-amino-4-benzoylamino-benzenes, such as for example, 1-amino-4-benzoylaminobenzene without further substituents, but the benzene nuclei may contain advantageously further substituents, such as for instance a halogen atom, preferably chlorine, alkyl- or alkoxy groups of low molecular weight. Thus the aminobenzoyl-aminobenzenes of the formula (6)
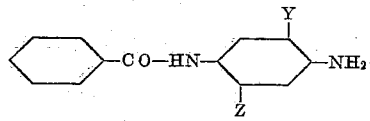

wherein Y represents a chlorine atom or an alkoxy group of low molecular weight and Z stands for an alkyl- or alkoxy-group of low molecular weight, are, for instance, particularly interesting. As examples of such diazo-components there may be mentioned:

1-amino-2:5-dimethoxy-4-benzoyl-aminobenzene
1-amino-2:5-diethoxy-4-benzoyl-aminobenzene
1-amino-2-methoxy-4-benzoylamino-5-methylbenzene
1-amino-2-chloro-4-benzoylamino-5-methoxybenzene The azo-compounds containing carboxylic acid groups of Formula 5 are treated with agents capable of forming acid halides. As such agents there are to be understood those which are capable of converting carboxylic acids into their acid halides, for example their bromides or chlorides: there are especially suitable as such agents phosphorus halides, phosphorus pentabromide, phosphorus trichloride, phosphorus pentachloride, or phosphorus oxyhalides. It is of advantage to choose acid-chlorinating agents, i. e. those which serve for the preparation of the appropriate acid chlorides such as phosphorus pentachloride and thionyl chloride.

The treatment with such acid-halogenating agents is advantageously carried out in an inert organic solvent, such as dimethyl-formamide, a chlorobenzene, for example, mono- or dichloro-benzene, toluene, xylene, benzene or nitrobenzene.

In preparing such acid halides it is generally of advantage first to dry the azo-compound produced in an aqueous medium or to free it from water by azeotropic distillation in an organic solvent. This azeotropic drying may, if desired, immediately precede the treatment with the halogenating agent.

As diamines of Formula 4 there are advantageously used those whose amino groups are both bound to aromatic carbon atoms, for example those in which $R_3$ represents an aromatic radical, for instance a radical of the naphthalene or benzene series, in which the amino groups may be primary or, if desired, secondary. The diamines may be mononuclear, such as 1:4-diaminobenzene, 1:4-diamino-2:5-dialkoxy-benzenes or 1:4-diamino-benzenes, having in the 2- and 5-position various substituents such as nitro-, halogen atoms, alkoxy groups, alkyl groups.

As a rule particularly valuable results are obtained when di- and polynuclear amines are used, as for instance, when 4:4'-diamino-diphenyl and its derivatives are used, for example, 3:3'-dichloro-3:3'-dimethyl-, 3:3' - dialkoxy - 4:4'-diamino-diphenyl, 3:5:3':5'-tetrachloro-4:4'-diamino-diphenyl and 3:5:3':5'-tetramethyl-4:4'-diamino-diphenyl. In many cases valuable dyestuffs are also obtained by using diamines of the benzene series in which two identical or different benzene nuclei are linked together by a suitable bridge member, for example, by oxygen, or an —SO₂— group, as in the case, for example, of 4:4'-diamino-diphenyl-sulfone, 3:3'-diamino-4:4'-dichloro-diphenyl sulfone, 3:3'diamino4:4'-dimethoxy-diphenyl sulfone, or a —CO— group such as for example, 3:3'-diamino-diphenyl ketone, 3:3'-diamino-4:4'-dichloro-diphenyl kefone, 3:3'-diamino-4:4'-dimethoxy-diphenyl sulfone, or a —CH₂— group such as for example, 3:3'-diamino-diphenyl methane, 3:3'-diamino-4:4' - dichloro - diphenyl methane, 4:4'-diamino-3:3'-dichloro-diphenyl methane, 4:4'-diamino-3:5:3':5'-tetrachloro-diphenyl methane, or the groups —NHCO—, NHCONH—, —SO₂—NH—, —CH=CH—, —CH₂CH₂—,
—HN—OC—C₂H₄—CO—NH—, —N=N—
Finally there come into consideration diamines of quite a different kind, for example, 2:8-diamino chrysene, 4:11-diamino-fluoranthene, 2:6- or 1:5-diamino-naphthalene, 2:6-diamino-benzthiazoles such as 2-(4'-amino-phenyl)-6-amino-benzthiazole.

The condensation of the carboxylic acid halides described above with the diamines is advantageously carried out in an anhydrous medium. Under these conditions the condensation generally proceeds surprisingly easily even at temperatures within the range of the boiling points of normal organic solvents such as toluene, monochlorobenzene, dichlorobenzene, trichlorobenzene, nitrobenzene and the like. In order to accelerate the reaction it is generally desirable to remove the hydrochloric acid obtained during condensation, for example by continuous distillation, boiling under reflux or by adding an acid-binding agent such as anhydrous sodium acetate, pyridine or anhydrous ammonia. The dyestuffs so obtained are in part crystalline and in part amorphous, and are generally obtained in very good yield and in a pure state. It may be of advantage, in order to produce especially pure dyestuffs, first to isolate the acid chlorides obtained from the carboxylic acids, and if desired, to recrystallize the acid chlorides. In some cases, however, the isolation of the acid chlorides may be dispensed with without any harmful effects, and in some cases even with an improvement in the result, and the condensation carried out immediately following the preparation of the acid chloride. If asymmetrical acid amide derivatives are to be prepared, the condensation of the diamine may be carried out with the two different acid halides in two steps or in a single step.

The new acid amide derivatives of azo-dyestuffs according to Formula 1 are pigments and as a rule are distinguished by an especially good fastness to migration and also by their temperature resistance and fastness to solvents. These properties are valuable above all for so-called pigment printing, that is to say, printing processes which depend on fixing pigments by means of suitable adhesives, such as casein, hardenable plastics, especially urea or melamine-formaldehyde condensation products, polyvinyl chloride or polyvinyl acetate solutions or emulsions, or other emulsions (for example oil-in-water or water-in-oil emulsions) or a substratum, especially on textile fibers but also on other flat shaped structures such as paper (for example wall-papers) or fabrics made of glass fibers. The pigments can also be used for other purposes, for example, in a finely dispersed form for dyeing artificial silk made of viscose or cellulose ethers or esters or superpolyamides or super-polyurethanes in the spinning solution, also serve well in the manufacture of colored lakes or lake formers, solutions and products made of acetyl cellulose, nitrocellulose, natural resins, or artificial resins such as polymerization or condensation resins, for example, aminoplasts, phenoplasts, polystyrene, polyethylene, polyacryl, rubber, casein, silicones and silicone resins. They can also be used with advantage in the manufacture of colored pencils, cosmetic preparations and laminated plates.

By virtue of the especially favorable physical form in which the products of the invention are generally obtained, and owing to their chemical inertness and good temperature resistance, they can usually be dispersed easily in masses or preparations of the aforesaid kind, and advantageously at a stage at which these masses or preparations have not yet reached their final shape. The operations necessary for shaping, such as spinning, pressing, hardening, casting, sticking, can then be carried out without difficulty in the presence of the pigment of this invention, without any chemical reactions of the substratum such as further polymerizations, condensations, etc. being inhibited.

The following examples illustrate the invention without limiting its scope in any way, the parts and percentages being by weight unless otherwise stated.

Example 1

49.9 parts of the azo-dyestuff from diazotized 1-amino-2:5-diethoxy - 4 - benzoyl - aminobenzene and 2-hydroxy-naphthalene-3-carboxylic acid are stirred in 300 parts of ortho-dichlorobenzene. 15 parts of thionyl chloride are poured in and the whole heated to 120 to 130° C. for an hour while stirring. A warm solution of a temperature of 80° C. of 9.2 parts of 4:4'-diamino-diphenyl in 50 parts of ortho-dichlorobenzene and 5 parts of anhydrous pyridine is added to the clear reddish blue solution and the whole is maintained at a temperature of 120–130° C. for 15 hours. It is then allowed to cool to 100° C. and a current of dry ammonia gas is introduced until a test portion gives a neutral reaction when stirred with water. The precipitated pigment is filtered, thoroughly washed with warm ortho-dichlorobenzene at 100° C. mixed with hot water while adding a dispersing agent and the dichlorobenzene adhering is distilled off with steam. The whole is then filtered and dried at 80° C. in vacuo.

There is obtained a soft-grained, blue powder which dissolves in concentrated sulfuric acid with a greenish blue color and which colors polyvinyl chloride in pure reddish blue shades. Fastness to migration is very good.

By using 5.4 parts of 1:4-diaminobenzene instead of the 4:4'-diaminophenyl there is obtained a similar blue pigment. A reddish blue pigment is obtained when instead of 4:4'-diaminophenyl there is used 3:3'-dichloro-4:4'-diaminodiphenyl, and a greenish blue pigment is obtained when 1:5-diamino-naphthalene is used.

Example 2

47.1 parts of the azo-dyestuff from diazotized 1-amino-2:5-dimethoxy-4-benzoylaminobenzene and 2-hydroxy-naphthalene-3-carboxylic acid are converted into the acid chloride according to the method used in Example 1. The acid chloride is condensed with 4:4'-diaminodiphenyl also according to the manner described in Example 1.

A soft, reddish blue powder is obtained which dissolves in concentrated sulfuric acid with a greenish blue color and when incorporated by rolling in polyvinyl chloride colors it in reddish blue shades of very good fastness to migration. Still purer shades are obtained by using 3:3'-dichloro-4:4'-diamino-diphenyl or 2:5-dichloro-1:4-diaminobenzene instead of 4:4'-diamino-diphenyl.

Example 3

The pigment obtained from 45.5 parts of the azo-dyestuff from diazotized 1-amino-2-methoxy-4-benzoyl-amino-5-methyl-benzene and 2-hydroxy-naphthalene-3-carboxylic acid and 9.2 parts of 4:4'-diamino-diphenyl according to Example 1 is a soft violet powder, which dissolves in concentrated sulfuric acid with a violet color and colors polyvinyl chloride in pure violet tints of very good fastness to migration.

By using 3:3'-dimethyl-4:4'diamino-diphenyl or 3:3'-dichloro-4:4'-diamino-diphenyl instead of the 4:4'-diamino-diphenyl there is obtained a somewhat more reddish violet pigment having the same good fastness to migration.

Example 4

47.5 parts of the azo-dyestuff from diazotized 1-amino-2-chloro-4-benzoylamino-5-methoxy-benzene and 2-hydroxy-naphthalene-3-carboxylic acid are converted into acid chloride according to the method used in Example 1, and the acid chloride condensed with 9.2 parts of 4:4'-diaminodiphenyl.

A soft, violet powder is obtained which dissolves in concentrated sulfuric acid with a violet color and when incorporated by rolling in polyvinyl chloride colors it in violet tints of very good fastness to migration.

By using 3:3'-dimethyl-4:4'-diamino-diphenyl or 3:3'-dichloro-4:4'-diamino-diphenyl instead of 4:4'-diamino-diphenyl, similar tints are obtained. With 1:5-diamino-naphthalene or 1:4-diaminobenzene dyestuffs are obtained which color polyvinyl chloride in reddish blue tints.

What is claimed is:

1. An acid amide derivative of an azo dyestuff, which derivative is free from sulfonic acid groups and corresponds to the formula

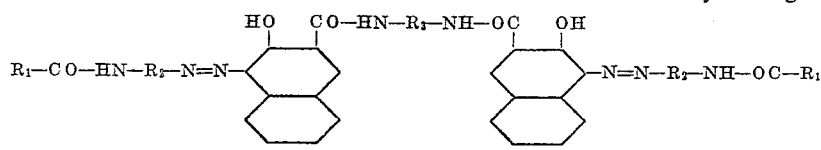

in which $R_1$ and $R_2$ each represents an aromatic radical of the benzene series, and $R_3$ represents the radical of a non-vattable aromatic carbocyclic compound.

2. An acid amide derivative of an azo dyestuff which derivative is free from sulfonic acid groups and corresponds to the formula

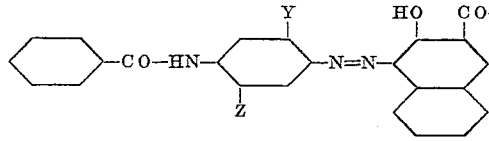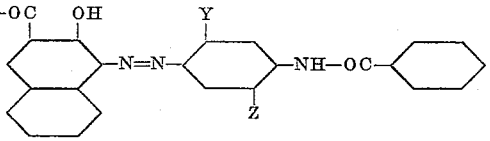

in which Y represents a member selected from the group consisting of a chlorine atom and an alkoxy group of low molecular weight, Z represents a member selected from the group consisting of an alkyl group of low molecular weight and an alkoxy group of low molecular weight, and $R_3$ represents an aromatic radical containing only carbocyclic rings and at the most two rings of this kind.

3. The acid amide derivative of the formula

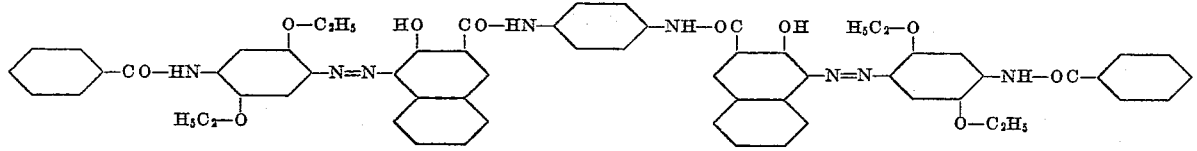

4. The acid amide derivative of the formula

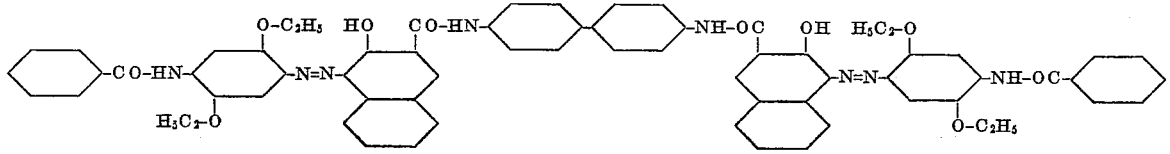

5. The acid amide derivative of the formula

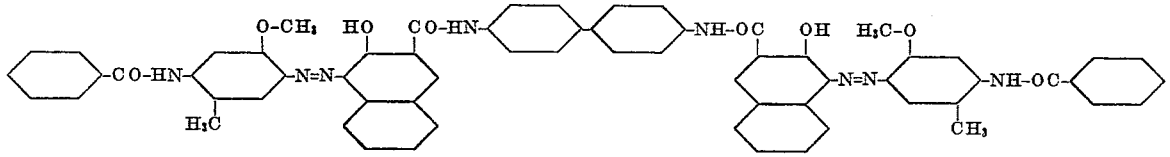

6. The acid amide derivative of the formula

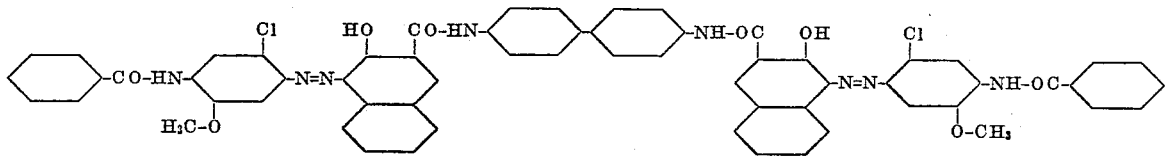

7. The acid amide derivative of the formula

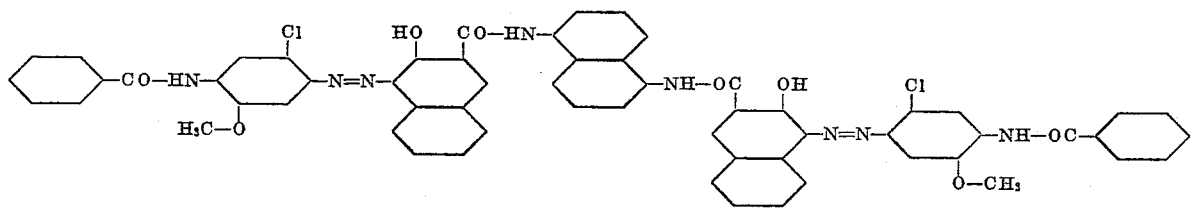

No references cited.